(12) United States Patent
Lu

(10) Patent No.: US 11,523,614 B2
(45) Date of Patent: Dec. 13, 2022

(54) **SOLUBLE GRANULE OF *BACILLUS VELEZENSIS* AND ITS PREPARATION METHOD**

(71) Applicant: Zhijun Lu, Beijing (CN)

(72) Inventor: Zhijun Lu, Beijing (CN)

( * ) Notice: Subject to any disclaimer, the term of this patent is extended or adjusted under 35 U.S.C. 154(b) by 365 days.

(21) Appl. No.: 16/683,290

(22) Filed: Nov. 14, 2019

(65) Prior Publication Data

US 2020/0359634 A1    Nov. 19, 2020

(30) Foreign Application Priority Data

May 17, 2019 (CN) .......................... 201910413252.X
Nov. 1, 2019 (CN) .......................... 201911059070.3

(51) Int. Cl.
*A01N 63/00* (2020.01)
*A01N 25/12* (2006.01)
*A01N 63/10* (2020.01)

(52) U.S. Cl.
CPC ............. *A01N 63/00* (2013.01); *A01N 25/12* (2013.01); *A01N 63/10* (2020.01)

(58) Field of Classification Search
None
See application file for complete search history.

(56) References Cited

U.S. PATENT DOCUMENTS

| | | | | |
|---|---|---|---|---|
| 2015/0126369 | A1* | 5/2015 | Bristow | A01N 47/38 504/136 |
| 2018/0020676 | A1* | 1/2018 | Taghavi | A01N 63/22 504/117 |

FOREIGN PATENT DOCUMENTS

| | | |
|---|---|---|
| CN | 103053527 A | 4/2013 |
| CN | 103931657 A | 7/2014 |
| CN | 104285983 A | 1/2015 |
| CN | 105265493 A | 1/2016 |
| CN | 107223661 A | 10/2017 |
| CN | 107254427 A | 10/2017 |
| CN | 107446847 A | 12/2017 |
| CN | 107960103 A | 4/2018 |
| CN | 108949614 A | 7/2018 |
| CN | 109652336 A | 4/2019 |

OTHER PUBLICATIONS

Nam, Myeong Hyeon; et al; "Biological control of strawberry Fusarium wilt caused by *Fusarium oxysporum* f. sp. fragariae using Bacillus velezensis BS87 and RK1 formulation" Journal of Microbiology and Biotechnology, 19, 520-524, 2009 (Year: 2009).*
Cai Gaolei, et al., Research Progress on Bacillus velezensis, Northern Horticulture, 2018, pp. 162-167, vol. 12.
Hua Naizhen, Properties and Processing of Water Soluble Granule, World Pesticides, 2017, pp. 14-19, 25, vol. 39, No. 2.
J. Bridge, S L J. Page Estimation of Root-Knot Nematode Infection Levels On Roots Using a Rating Chart.Tropical Pest Manag, 1980, 26: 296-298.
Chen Chong, Wang Chengliang, Zhang Lusheng, Bacillus Cereus TS-02 for the Control of Strawberry Powdery Mildew, Anhui Agricultural Science, 2007, 35 (11): 3298-3300.
Baogen Gu, Naichi Liu, Xinping Wu, Qinghua Zhu. Pesticide-Guidelines for the Field Efficacy Trials(I)—Fungicides Against Leaf Diseases of Rice. GB/T 17980.19-2000.

* cited by examiner

*Primary Examiner* — David W Berke-Schlessel
(74) *Attorney, Agent, or Firm* — Bayramoglu Law Offices LLC (57) ABSTRACT

A water soluble granule (SG) of *Bacillus velezensis*, including 0.1-97 parts by weight of the stock powder of *B. velezensis* or/and its secondary metabolic active bacteriostatic substances, 1-5 parts by weight of a binder, 1-10 parts by weight of a disintegrant, 1-5 parts by weight of a dispersant, and other filler making up to 100 parts by weight. The soluble granule of *B. velezensis* has advantages of good storage resistance, easy use, strong activity and high safety.

19 Claims, 2 Drawing Sheets

SOLUBLE GRANULE OF *BACILLUS VELEZENSIS* AND ITS PREPARATION METHOD

CROSS REFERENCE TO THE RELATED APPLICATIONS

This application is based upon and claims priority to Chinese Patent Application No. CN201910413252.X, filed on May 17, 2019 AND THE Chinese Patent Application No. CN201911059070.3, filed on Nov. 1, 2019, the entire contents of which are incorporated herein by reference.

TECHNICAL FIELD

The present application relates to a microbial formulation, in particular to a soluble granule with stock powder of *B. velezensis* or/and its secondary metabolically active bacteriostatic substances as active ingredient and a method for preparation of the same.

BACKGROUND

*Bacillus*-based formulations are important biological pesticides, and have attracted more and more attentions. According to data released by the Ministry of Agriculture, China, by the end of March 2019, there are in total 382 *Bacillus*-based pesticides officially registered in China, including 33 raw pesticides, of which 243 relate to *B. thuringiensis* and 139 relate to other species of *Bacillus* spp. The *Bacillus*-based pesticides accounts for 1.1% of the total pesticides registered in China, and are only secondary to Avermectin products in the field of bio-pesticide. At present, the registered *Bacillus*-based pesticides can be mainly categorized into the following three dosage forms: 1) wettable powder, or powder, comprising 227 pesticides, and accounting for 65% of the total of the registered *Bacillus*-based pesticides (excluding 33 raw pesticides); 2) aqueous formulation or suspension, including 114 pesticides, and accounting for 32.7% of the total of the registered *Bacillus*-based pesticides (excluding 33 raw pesticides); 3) granule or aqueous dispersion, including 8 pesticides and accounting for 2.3% of the total of the registered *Bacillus*-based pesticides (excluding 33 raw pesticides). It can be seen that the wettable powder (including powder) and the suspension (including aqueous formulation) are dominating *Bacillus*-based pesticide products in China and account for 97.7% of the total of the registered *Bacillus*-based pesticides. Meanwhile, almost all the active components registered in *Bacillus*-based products are live spore content. In contrast, other dosage forms have a little percentage. To a large extent, this situation reflects some serious issues in the field of bio-pesticides, such as the lack of innovation in the development of *Bacillus*-based formulations, the serious homogenization of products in the market, and the options available to growers are limited.

Generally, suspensions (aqueous formulation) of *Bacillus*-based products have some significant advantages, such as simple production process, low cost for production, easy to add other ingredients, easy to use in the field and the availability of secondary metabolic active bacteriostatic substances by fermentation. Nevertheless, they also have some disadvantages, such as low content of active ingredients, inconvenient storage, intolerance to storage and preservation, short shelf life, high cost for transportation, easy precipitation and so on. On the other hand, wettable powder (including powder) and water-dispersible granules of the *Bacillus*-based products also have significant advantages, for example, high content of active ingredients, convenient storage, storage resistance, convenient transportation, low cost for transportation, etc. Their disadvantages are mainly reflected in higher cost for production than that of the aqueous formulation, ease of producing dust, difficulty in dispersing when being used in the field, ease of blocking slim pipes, nozzle of a drip irrigation system, etc. Therefore, current produced dosage of *Bacillus*-based pesticides cannot meet the practical needs.

With the advancement of economy, society, science and technology, the development of the pesticide industry has shown a new trend worldwide: the active ingredients of the pesticide products are making great strides toward the biological components, and the dosage forms are developing in the direction of water solubility, environmental friendly and high efficiency. People's increasing awareness of health and safety, increasing consumption patterns and levels of agricultural products have placed new demands for the development of new microbial preparations. Many fruit crops such as strawberries, blueberries, raspberries, grapes, peaches, cherries, lettuce, etc., which are popular among people, especially the old, the young and women, are of high-value and ready-to-eat. The crops are often eaten at the site, and can be picked every day; the green and organic products of bananas, mangoes, rice, lettuce, Chinese herbal medicines and other crops are welcomed by the market. However, the diseases in these crops often occur during the whole growth period, especially during the maturity period. The requirements for pesticide control are higher: first, the pesticide products (including active ingredients and various auxiliary ingredients) should be low-toxic or even non-toxic; secondly, the products should be effective enough, and finally should be in compliance with modern production methods. However, pesticide products which are currently available to fruits, crops, Chinese herbal medicine and meet the above requirements, are rare even for *Bacillus*-based microbial formulations.

*B. velezensis* is a new *Bacillus* species that was first named internationally in 2005 and was reported only sporadically from 2005 to 2015. However, in recent years, attention on this species has drastically increased, especially since 2016 due to its excellent disease prevention characteristics and growth-promoting property. As of the beginning of 2019, there were about 106 articles and 131 patent applications (including issued patents and pending applications) relating to *B. velezensis* worldwide. In terms of the country of application, the largest number of patent applications were filed in China, accounting for 42.86%. In terms of the technical field, the applications were mainly focused on plant growth promotion and disease prevention and control, compost maturation, microbial food processing applications, animal feed processing, environmental protection, aquaculture and so on. Among the 131 patents that have been published or issued, most of them are related to the strains of *B. velezensis* and its viability and activity, as well as the fermentation of strains. There are few patent applications directed to development of new dosage forms of new species. CN109652336A discloses a strain of *B. velezensis* and its powders, and CN201810644060 discloses a microbial formulation (mainly including four traditional dosage forms, wettable powder, suspension, water-dispersible particle or granules) which is used to prevent and control root rot in peanuts. At present, more countries pay attention to scientific and technological innovation than ever before, many enterprises in the world are actively promoting the strong collaborations with universities and scientific research institutions to accelerate the development and application of products related to *Bacillus*-based products, and making initial progress. There is an imminent need for creation and marketing of a soluble granule of *B. velezensis* which is new, safe, efficient and suitable for modern agricultural production at a large scale.

SUMMARY

It is a main object of the present application to provide a soluble granule of *B. velezensis*, thereby providing a new dosage form for the development of *B. velezensis* microbial formulation in the commodity market and providing a new product for effective prevention and control of diseases in high value-added crops.

In the soluble granule of *B. velezensis* according to the present application, the soluble granule comprises 0.1-97 parts by weight of stock powder of *B. velezensis* or/and its secondary metabolic active bacteriostatic substances (the mass fraction ratio of the stock powder of *B. velezensis* to the stock powder of the secondary metabolic active bacteriostatic substances is 100:0~0:100), 1-5 parts by weight of a binder, 1-10 parts by weight of a disintegrant, 1-5 parts by weight of a dispersant and a filler making up to 100 parts by weight.

In the present application, the raw materials used in preparation of the stock powder of *B. velezensis* or/and its secondary metabolic active bacteriostatic substances are of food-grade, completely soluble in water, and selected from yeast powder, peptone, NaCl, sucrose, soluble starch and combinations thereof.

In the soluble granule of the *B. velezensis* according to the present application, the content of the *B. velezensis* is at least 100 billion CFU/g in the stock powder of *B. velezensis*; and the secondary metabolic active bacteriostatic substances are the proteins and/or enzymes and/or ester peptides produced by *B. velezensis*.

Preferably, the amount of the stock powder of *B. velezensis* is 10-30 parts and/or the amount of the stock powder of secondary metabolically active bacteriostatic substances is 0-50 parts, per 100 parts by weight of the soluble granule.

In the soluble granule of *B. velezensis* according to the present application, the binder is selected from one or more of soluble starch, xanthan gum, polyvinyl alcohol, soybean protein and combinations thereof, and its amount in the soluble granule is preferably 3-5 parts by weight.

In the soluble granule of *B. velezensis* of the present application, the disintegrant is selected from one or more of milk powder, glucose, ammonium sulfate, sodium acetate and combinations thereof, and its amount in the soluble granule is preferably 5-10 parts by weight.

In the soluble granule of *B. velezensis* according to the present application, the dispersant is selected from one or more of the yeast powder, sodium lignin sulfonate, polyacrylamide and combinations thereof, and its amount is preferably 3-5 parts by weight.

In the soluble granule of *B. velezensis* according to the present application, the filler is selected from one or more of the maltodextrin, sodium chloride, sodium bicarbonate and combinations thereof, and its amount in the soluble granule is to make up to 100 parts by weight.

It is the secondary object of the present application to provide a method for preparing the soluble granule of *B. velezensis*, includes the following steps:
a. Placing the stock powder of *B. velezensis* or/and its secondary metabolic active bacteriostatic substances, the binder, the disintegrant, the dispersant and the filler in a tank in order, and mixing them thoroughly;
b. Ultra-micro crushing the mixed materials in an airflow pulverizer;
c. Evenly kneading the ultra-micro crushed mixture in the mixer, and adding water slowly until the mixture begins to aggregate into a pellet;
d. Granulating by extruding the kneaded mixture through a squeezing granulator;
e. Drying the initially-made granules at the temperature of 30° C.-40° C., until the moisture of the granules is less than 4%;
f. Screening initially made granules through 20 mesh and 40 mesh vibrating screen classifier respectively, to give the granules between 40 mesh and 20 mesh, viz., the soluble granules of *B. velezensis*.

The present application also aims at the use of the soluble granule of *B. velezensis* in preventing and controlling plant diseases such as fruits, fruits, vegetables, flowers, crops, Chinese medicinal materials and trees and promoting plant growth.

The soluble granule of *B. velezensis* according to the present application is environment-friendly, stable in nature, durable in efficacy and compatible with various production methods in modern agriculture. It is expected to help solve the practical problems mentioned above and make up for the shortage of agricultural production and consumption links. Specifically, the soluble granule of *B. velezensis* according to the present application has the following significant advantages:

Firstly, the active ingredient of the soluble granule, the stock powder of *B. velezensis* or/and its secondary metabolic active bacteriostatic substances, has a broad spectrum and highly efficient bacteriostatic activity and high stress resistance. The new microbial factor is safe for people, animals, crops and environment; Secondly, all raw materials used in preparation of the soluble granule are food grade, and are thus especially suitable for prevention and treatment of disease in ready-to-eat crops, high value-added high-quality agricultural products; Thirdly, all raw materials used in preparation of the soluble granule are completely water-soluble, the granule can disintegrate quickly and can be dissolved in water quickly and evenly. Thus the utilization rate of pesticide active components is higher, which is more conducive to improve labor efficiency and effect; Fourthly, the soluble granule has enough fineness and strength, has good ventilation and fluidity, can be resistant to long-term storage without agglomerate, and is resistant to transport without breakage, thereby possessing better product features; At last, the soluble granule is suitable for all kinds of spraying, drip irrigation and soil medicine equipment, and more adapted to modern agricultural production.

DETAILED DESCRIPTION OF THE EMBODIMENTS

Figure 1:
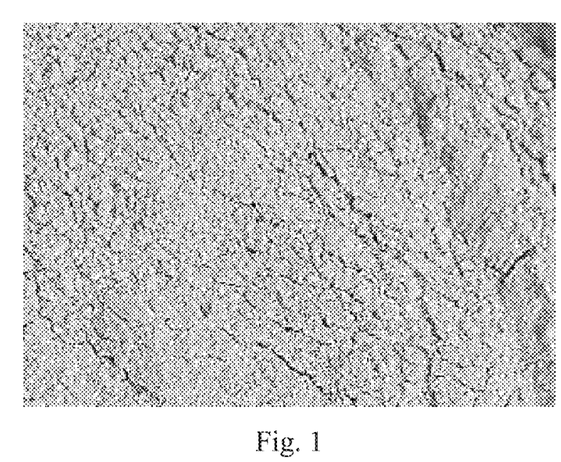
FIG. 1 shows a photo of a conventional wettable powder of *B. velezensis* (Active component content is 20 billion CFU/g).
Figure 2:
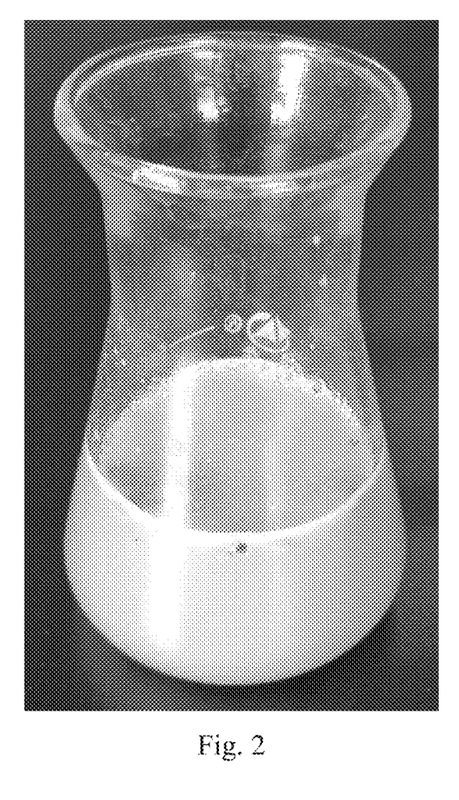
FIG. 2 shows a photo of 10% suspension of the conventional *B. velezensis* wettable powder in water (Active component content is 20 billion CFU/g).
Figure 3:
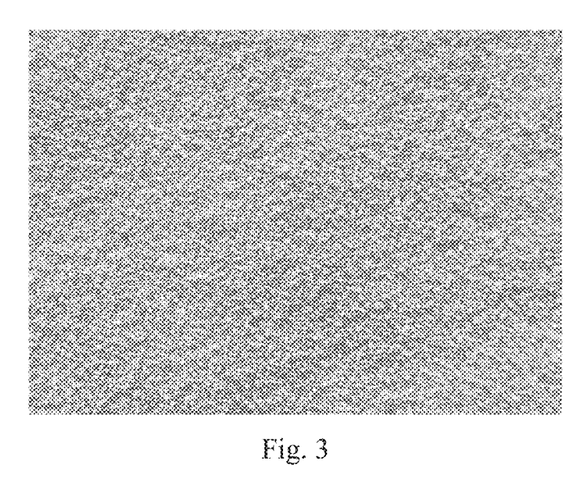
FIG. 3 shows a photo the soluble granule of *B. velezensis* (Active component content is 20 billion CFU/g) according to the present application.
Figure 4:
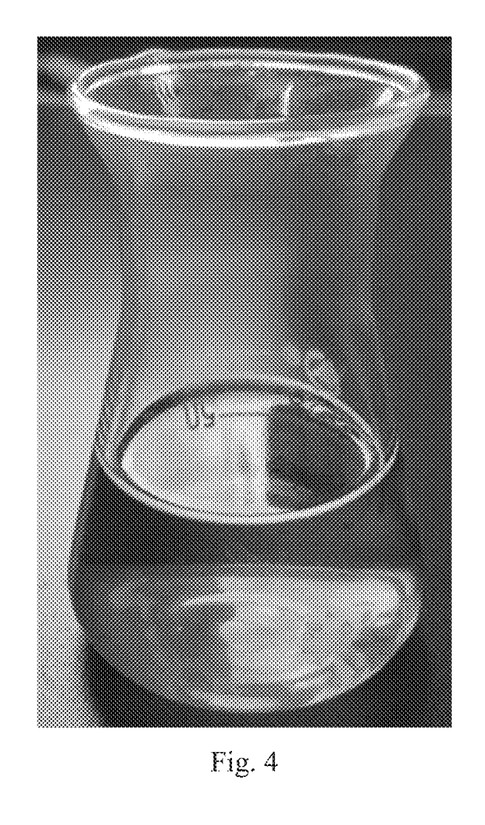
FIG. 4 shows a photo of 10% solution of the soluble granule of *B. velezensis* (Active component content is 20 billion CFU/g) in water according to the present application.

In the specific implementation scheme of the application, just take the strain NSZ-YBGJ0001 as an example. The strain was isolated from Lingshui County, Sanya City, Hainan Province, China, and deposited at China General Microbiological Culture Collection Center under accession CGMCC No. 14384. The present application includes but is not limited to NSZ-YBGJ0001 (CGMCC No. 14384) strain, and all soluble granules with *B. velezensis* strains and/or their secondary metabolizing active bacteriostatic substances as active components are within the protection scope.

In an aspect, the present application relates to a soluble granule of *B. velezensis*, comprising 0.1-97 parts by weight of stock powder of *B. velezensis* NSZ-YBGJ0001 (CGMCC No. 14384) or/and its secondary metabolic active bacteriostatic substances (the mass fraction ratio of the stock powder of *B. velezensis* to the stock powder of the secondary metabolic active bacteriostatic substances is 100:0~0:100), 1-5 parts by weight of a binder, 1-10 parts by weight of a disintegrant, 1-5 parts by weight of a dispersant, and a filler making up to 100 parts by weight.

In an embodiment of the soluble granule of *B. velezensis* according to the present application, the raw materials for seed fermentation and three-stage industrial fermentation in preparation of stock powder of *B. velezensis* NSZ-YBGJ0001 (CGMCC No. 14384) or/and its secondary metabolic active bacteriostatic substances include, but are not limited to, fully water-soluble and food-grade yeast powder, peptone, NaCl, sucrose, soluble starch.

In an embodiment of the soluble granule of *B. velezensis* according to the present application, the temperature in the second half of the tertiary industrial fermentation, will be increased to 40° C.-45° C., to improve the yield and the stress resistance of spores, and produce high-quality stock powder of *B. velezensis* NSZ-YBGJ0001 (CGMCC No. 14384) or/and its secondary metabolic active bacteriostatic substances.

The high-quality stock powder of *B. velezensis* NSZ-YBGJ0001 (CGMCC No. 14384) or/and its secondary metabolic active bacteriostatic substances is formed by spray drying of the fermentation product of the tertiary fermentation, and the amount of the active ingredient of NSZ-YBGJ0001 (CGMCC No. 14384) is over 100 billion CFU (Colony Forming Unit, CFU)/g.

In an embodiment of the soluble granule of *B. velezensis* according to the present application, the stock powder of *B. velezensis* NSZ-YBGJ0001 (CGMCC No. 14384) or/and its secondary metabolic active bacteriostatic substances in the soluble granule is 0.1-97 parts by weight, such as 0.5, 1, 5, 10, 15, 20, 25, 30, 35, 40, 45, 50, 55, 60, 65, 70, 75, 80, 85, 90, preferably 10-30, such as 11-29, 12-28, 13-27, 14-26, 15-25, 16-24, 17-23, 18-22, 19-21, such as 10, 11, 12, 13, 14, 15, 16, 17, 18, 19, 20, 21, 22, 23, 24, 25, 26, 27, 28, 29, 30 parts by weight, and any value between any two values mentioned above, such as 10.5, 11.5, 12.6, 15, 17.5, 20.5, 25.5, 28.6, 29.5 parts by weight, etc.

In an embodiment of the soluble granule of *B. velezensis* according to the present application, the amount of the active ingredient *B. velezensis* NSZ-YBGJ0001 (CGMCC No. 14384) is 100 million CFU/g or more, preferably 10-30 billion CFU/g, such as 11-29 billion CFU/g, 12-28 billion CFU/g, 13-27 billion CFU/g, 14-26 billion CFU/g, 15-25 billion CFU/g, 16-24 billion CFU/g and 17-23 billion CFU/g, 18-22 billion CFU/g, 19-21 billion CFU/g, such as 10 billion CFU/g, 15 billion CFU/g, 20 billion CFU/g, 25 billion CFU/g and 30 billion CFU/g in the stock powder of *B. velezensis* NSZ-YBGJ0001 (CGMCC No. 14384).

In an embodiment of the soluble granule of *B. velezensis* according to the present application, the binder is selected from one or more of soluble starch, xanthan gum, polyvinyl alcohol, soybean protein and combinations thereof, and the amount of the binder in the soluble granule is 1-5 parts by weight, such as 1, 2, 3, 4, 5 parts by weight, and any value between any two values mentioned above, such as 1.2, 2.3, 3.5, 4.5 parts by weight, preferably 3-5 parts by weight, such as 3, 3.5, 4, 4.5, 5 parts by weight.

The disintegrant is selected from one or more of milk powder, glucose, ammonium sulfate, sodium acetate and combinations thereof, the amount of the disintegrant in the soluble granule is 1-10 parts by weight, such as 1, 2, 3, 4, 5, 6, 7, 8, 9, 10 parts by weight, and any values between any two values mentioned above, such as 1.2, 2.5, 3.4, 4.5, 5.6, 6.6, 7.5, 8.4, 9.5 parts by weigh, etc., preferably 5-10 parts by weigh, e.g. 5.5, 6, 6.5, 7, 7.5, 8, 8.5, 9, 9.5, 10 parts by weight, and so on.

The dispersant is selected from one or more of the yeast powder, sodium lignin sulfonate, polyacrylamide and combinations thereof, the amount of the dispersant in the soluble granule is 1-5 parts by weight, such as 1, 2, 3, 4 parts by weight, and any values between any two values mentioned above, such as 5, 2.3, 3.5, 4.5 parts by weight, preferably 3-5 parts by weight, such as 3, 3.5, 4.5, 5 parts by weight.

The filler is selected from one or more of maltodextrin, sodium chloride, sodium bicarbonate and combinations thereof, the amount of the filler is 100 parts by weight in the soluble granule.

On the other hand, the present application relates to a method for preparing the soluble granule of *B velezensis*, comprises the steps of:

a. Placing the stock powder of *B. velezensis* NSZ-YBGJ0001 (CGMCC No. 14384) or/and its secondary metabolic active bacteriostatic substances, the binder, the disintegrant, the dispersant and the filler in a tank in order, and mixing them thoroughly;

b. Ultra-micro crushing the mixed materials in an airflow pulverizer;

c. Evenly kneading the ultra-micro crushed mixture in the mixer, and adding water slowly until the mixture begins to aggregate into a pellet;

d. Granulating by extruding the kneaded mixture through a squeezing granulator;

e. Drying the initially-made granule at the temperature of 30° C.-40° C., until the moisture of the granule is less than 4%;

f. Screening initially made granule through 20 mesh and 40 mesh vibrating screen classifier respectively, to give the granules between 40 mesh and 20 mesh, viz., the soluble granule of *B. velezensis*.

In the third aspect, the application relates to the use in preventing and controlling plant diseases such as fruits, vegetables, flowers, crops, Chinese medicinal materials and trees.

In the embodiment of the use of the application, fruits include but not limited to strawberries, blueberries, raspberries, grapes, peaches, cherries, bananas, mangos, oranges, pitaya, cherry tomatoes, watermelon, cantaloupe and melon.

In the embodiment of the use of the application, vegetables may be but not limited to lettuce, celery, cucumber, tomato, pepper, eggplant, cowpea and beans.

In the embodiment of the use of the application, the crops may be but not limited to rice, soybean, millet and wheat.

In the embodiment of the utility of the application, the Chinese medicinal materials include but not limited to lily, pepper, sichuan peppercorns, ginseng, wolfberry, fritillary bulb and Angelica sinensis.

In the embodiment of the utility of the present application, trees include but not limited to maple tree, smoke tree, Holly tree, berberis tree, locust tree, areca nut and coconut.

In an embodiment of the use according to the present application, the diseases include, but are not limited to rice blast, rice false smut, rice sheath blight, cotton verticillium wilt, cotton fusarium wilt, rape sclerotinia, tomato gray mould, celery leaf spot, root knot nematode, betel nut leaf spot, betel nut anthracnose, apple ring rot, banana leaf spot, banana root rot, strawberry root rot and peach brown rot, etc.

The technical solutions of the present application will be illustrated in detail with reference to the following examples below. In the following examples, all materials used in preparation of the stock powder of B. velezensis NSZ-YBGJ0001 (CGMCC No. 14384) or/and its secondary metabolic active bacteriostatic substances and the soluble granule of B. velezensis are food-grade materials, unless otherwise indicated herein or clearly contradicted by context.

EXAMPLE 1: PREPARATION OF STOCK POWDER OF B. velezensis OR/AND ITS SECONDARY METABOLIC ACTIVE BACTERIOSTATIC SUBSTANCES LB (Luria-Bertani) medium was used in activation and seed fermentation of B. velezensis NSZ-YBGJ0001 (CGMCC No. 14384) strain.

Culture broth for tertiary industrial fermentation system was prepared by an optimized formulation comprising yeast extract 5%, soluble starch 5%, sucrose 10%, dissolved in fresh broth and supplemented to 1000 mL. Fresh broth was prepared as follows: 10 parts by weight of fresh beef (bone) or/and fresh fish (bone), and 90 parts by weight of water are cook until meat (bone) was completely melt, to obtain cooked broth, and after filtration, water was added thereto to make up 100 parts by weight.

The tertiary industrial fermentation: the inoculation ratio of the primary fermentation and the secondary fermentation was 10%, the fermentation temperature was always controlled at 35° C. The third fermentation was divided into two stages, the inoculation ratio was increased to 20%, the fermentation temperature was controlled at 35° C. during the first stage, and the fermentation temperature was appropriately raised from 5-10° C. to 40-45° C. during the last stage, in order to improve the production of B. velezensis spores and the stress resistance of the bacteria.

In the fermentation broth after tertiary fermentation, the content of viable spores of B. velezensis can reach up to $10^8$ CFU/g. The high-quality stock powder of B. velezensis NSZ-YBGJ0001 (CGMCC No. 14384) can be formed by spray drying the fermentation product, in which the content of B. velezensis NSZ-YBGJ0001 (CGMCC No. 14384) is at least 100 billion CFU/g stock powder, and also some of its secondary metabolic active bacteriostatic substances included.

EXAMPLE 2: 10 BILLION CFU/g OF THE SOLUBLE GRANULE OF B. velezensis

Take it as an example to prepare 1000 kg of the soluble granule.

1. Raw Materials

B. velezensis NSZ-YBGJ0001 (CGMCC No. 14384) stock powder (the content of the active ingredient was more than 100 billion CFU/g stock powder) 100 kg, soluble starch (binder) 50 kg, milk powder (disintegrant) 100 kg, yeast powder (dispersant) 50 kg, and maltodextrin (filler) supplemented to 1000 kg.

2. Preparation Method

The soluble granule of B. velezensis NSZ-YBGJ0001 (CGMCC No. 14384) was prepared as follows:

a. The above materials were placed in a tank for mixing powders in sequence of the B. velezensis NSZ-YBGJ0001 (CGMCC No. 14384) stock powder, binder, disintegrant, dispersant and fillers, and were fully and evenly mixed;

b. The mixture was ultra-micro crushed in an airflow pulverizer;

c. The ultra-micro crushed mixture was kneaded evenly in a mixer, and water was added thereto slowly until the mixture began to aggregate into pellets;

d. The kneaded materials was granulated by squeezing them through a squeezing granulator to give initial granules;

e. The initially-made granules were dried at a temperature of 30° C.-40° C. until the moisture content of the granules was less than 4%;

f. The initially-made granules were screened through 20 mesh and 40 mesh vibrating screen classifier respectively, to give the granules between 40 mesh and 20 mesh, viz., the soluble granule of B. velezensis.

The content of B. velezensis NSZ-YBGJ0001(CGMCC No. 14384) in the soluble granule was 10 billion cfu/g.

EXAMPLE 3: 20 BILLION CFU/g OF THE SOLUBLE GRANULE OF B. velezensis

Take it as an example to prepare 1000 kg of the soluble granule.

1. Raw Materials

B. velezensis NSZ-YBGJ0001 (CGMCC No. 14384) stock powder (the content of the active ingredient was more than 100 billion CFU/g) 200 kg; soluble starch (binder) 50 kg; milk powder (disintegrant) 100 kg; yeast powder (dispersant) 50 kg; and maltodextrin (filler) supplemented to 1000 kg.

2. Preparation Method

The preparation method was the same as in the example 2.

The content of B. velezensis NSZ-YBGJ0001 (CGMCC No. 14384) in the soluble granule was 20 billion cfu/g.

EXAMPLE 4: 30 BILLION CFU/g OF THE SOLUBLE GRANULE OF B. velezensis

Take it as an example to prepare 1000 kg of the soluble granule.

1. Raw Materials

B. velezensis NSZ-YBGJ0001 (CGMCC No. 14384) stock powder (the content of the active ingredient was more than 100 billion CFU/g) 300 kg; soluble starch (binder) 50 kg; milk powder (disintegrant) 100 kg; yeast powder (dispersant) 50 kg; and maltodextrin (filler) supplemented to 1000 kg.

2. Preparation Method

The preparation method was the same as in the example 2.

The content of B. velezensis NSZ-YBGJ0001 (CGMCC No. 14384) in the soluble granule was 30 billion cfu/g.

EXAMPLE 5: COMPARISON OF VIABILITY AND STABILITY OF 20 BILLION CFU/g OF THE SOLUBLE GRANULE AND WETTABLE POWDERS OF B. velezensis STORED AT ROOM TEMPERATURE 20 billion CFU/g of the soluble granule of B. velezensis as prepared in Example 3 and 20 billion CFU/g of wettable powder of B. velezensis were respectively divided into five parts, packed in aluminium foil bags, sealed, and stored at a temperature of 20° C.-25° C. in dark, for one year.

Samples were taken on each part at five time points, viz. initial storage, first month, third month, sixth month and twelfth month from storage, respectively.

According to the product quality standards of these two microbial formulations, the two formulations were tested for their active ingredient content, microbial contamination rate, pH, long-lasting foaming and other indicators (for details, see table 1 and table 2 below).

The test results were shown in table 1 and table 2 below:

TABLE 1

Test results of viability and stability of 20 billion CFU/g of B. velezensis soluble granule at room temperature

| | Tested items | | |
|---|---|---|---|
| | B. velezensis soluble granule | | microbial |
| Storage time | Spore content (CFU/g) | Decomposition rate (%) | contamination rat (%) |
| 0 month | $2.36 \times 10^{10}$ | — | 0.26 |
| 1 month | $2.36 \times 10^{10}$ | 0 | 0.27 |
| 3 months | $2.33 \times 10^{10}$ | 1.27 | 0.38 |
| 6 months | $2.31 \times 10^{10}$ | 2.12 | 0.47 |
| 12 months | $2.26 \times 10^{10}$ | 4.24 | 0.52 |

TABLE 2

Test results of viability and stability of 20 billion CFU/g of B. velezensis wettable powder stored at room temperature

| | Tested items | | |
|---|---|---|---|
| | B. velezensis wettable powder | | microbial |
| Storage time | Spore content (CFU/g) | Decomposition rate (%) | contamination rat (%) |
| 0 month | $2.40 \times 10^{10}$ | — | 0.38 |
| 1 month | $2.40 \times 10^{10}$ | 0 | 0.38 |
| 3 months | $2.37 \times 10^{10}$ | 1.25 | 0.51 |
| 6 months | $2.26 \times 10^{10}$ | 5.83 | 0.70 |
| 12 months | $2.12 \times 10^{10}$ | 10.83 | 0.94 |

The table 1 and 2 showed that, the viability of B. velezensis soluble granule was higher than that of the wettable powder: the viability of the former was 95%, better than that of the latter (89%), and the decomposition rate of active ingredients and the microbial contamination rat in the former were lower than those of the latter, although the related indicators of the two formulations meet the standard requirements after storage for one year.

It can be seen that the soluble granule of B velezensis according to the present application is thus more stable, more active, more durable, and convenient to be stored for a long time, as compared to the wettable powder.

EXAMPLE 6: COMPARISON OF SOLUTION PROPERTIES OF 20 BILLION CFU/g OF THE SOLUBLE GRANULE AND WETTABLE POWDER OF B. velezensis AFTER STORAGE AT ROOM TEMPERATURE Both 20 billion CFU/g of soluble granule of B. velezensis as prepared in Example 3 and 20 billion CFU/g of wettable powders of B. velezensis were divided into five parts, packed in aluminium foil bags, sealed, and stored at a temperature of 20° C.-25° C. in dark for one year.

Samples were collected at five time points, viz., initial storage, first month, third month, sixth month and twelfth month from storage, respectively.

According to the relevant detection standards, the samples were diluted to 100 million CFU/mL with water to determine the stability, foamability and surface tension of the bacterial solutions.

The test results were shown in table 3 and table 4 below.

TABLE 3

Properties of the solution (100 million CFU/mL) of 20 billion CFU/g of B. velezensis soluble granule stored at room temperature

| | | Tested items | | | |
|---|---|---|---|---|---|
| | | Degree of dissolution and solution stability | | Persistent | Surface |
| Storage time | pH value | 5 min (%) | 18 h (%) | foamability (mL) | tension (mN/m) |
| 0 month | 6.8 | 99.9 | 100 | 15 | 41.379 |
| 1 month | 6.8 | 99.9 | 100 | 15 | 41.391 |
| 3 months | 7.0 | 99.8 | 100 | 15 | 41.387 |
| 6 months | 7.1 | 99.8 | 99.9 | 17 | 41.406 |
| 12 months | 7.3 | 99.7 | 99.9 | 20 | 41.394 |

TABLE 4

Properties of the solution (100 million CFU/mL) of 20 billion CFU/g of B. velezensis wettable powders stored at room temperature

| Storage time | pH value | Fineness (%) | Wetting time (s) | Suspension Rate (%) | Persistent foamability (mL) | Surface tension (mN/m) |
|---|---|---|---|---|---|---|
| 0 month | 6.8 | 99.2 | 75 | 89 | 26 | 41.536 |
| 1 month | 6.8 | 99.2 | 76 | 87 | 26 | 41.685 |
| 3 months | 7.0 | 99.1 | 79 | 84 | 27 | 43.373 |
| 6 months | 7.2 | 99.0 | 83 | 82 | 29 | 45.975 |
| 12 months | 7.4 | 99.0 | 85 | 80 | 33 | 49.768 |

The results showed that the soluble granule of B. velezensis according to the present application had better solubility, less foams and shorter foaming time, more stability, lower surface tensions, as compared to the wettable powders. The soluble granule was applied more conveniently, and could improve bioavailability and control effect of the pesticides.

The soluble granule of B. velezensis according to the present application is thus more suitable for modern agricultural production in practical use, and is more conducive to improving labor productivity and control effect.

EXAMPLE 7: CONTROL OF STRAWBERRY POWDERY MILDEW WITH 20 BILLION CFU/g OF THE SOLUBLE GRANULE OF B. velezensis IN THE FIELDS 1. Materials and Methods
1.1 Materials The soluble granule of B velezensis as prepared in Example 3, wherein the content of B. velezensis NSZ-YBGJ001 (CGMCC No. 14384) is 20 billion CFU/g.

1.2 Methods
1.2.1 Test Settings

The test was carried out in a greenhouse of strawberry, viz. plastic shed in Xingshou Town, Changping District, Beijing, China. The strawberry variety is HongYan. The soluble granule of B velezensis as prepared in Example 3 was mixed with water to prepare the solution with a concentration of $1.0 \times 10^8$ CFU/mL. The solution was further diluted 100 times as treatment group when use in the fields, and a blank control named CK was used.

The test for control of powdery mildew on strawberry leaves: each process was set to repeat 3 times in 2017, the area of each repeated plot was 166 m$^2$, and 1500 strawberries were planted in each plot. Powdery mildew occurred on strawberries on $13^{th}$, December, and from then on, the solution diluted 100 times was sprayed once every 8 days, for 3 times. The diluted solution was used in an amount of 75 kg per 667 m$^2$, with knapsack electric sprayer model 3WBD-20.

The test for control of powdery mildew on strawberry fruits: 120 infected fruits were randomly selected and dipped in the 100 time diluted solution of B. velezensis soluble granule.

1.2.2 Investigation Method

Thirty plants were planted in each plot to investigate the morbidity of powdery mildew on strawberry leaves and fruits of the whole plant, and the safety of solution to strawberries. Investigations were conducted, before inoculation, on day 7 after the first administration, on day 7 after the second administration, and on day 7 after the third administration, and the grade of the disease was recorded.

1.2.2.1 The criteria for leaf classification were as follows
Level 0: no disease spots;
Level 1: the area of disease spots accounted for less than 5% of the whole leaf area;
Level 3: the area of disease spots accounted for 6%-15% of the whole leaf area;
Level 5: the area of disease spots accounted for 16%-25% of the whole leaf area;
Level 7: the area of disease spots accounted for 26%-50% of the whole leaf area;
Level 9: the area of disease spots accounted for more than 50% of the whole leaf area.

1.2.2.2 The criteria for fruit classification were as follows
Level 0: no disease spots;
Level 1: the disease spot area accounted for less than 15% of the fruit area;
Level 2: the disease spot area accounted for 16%-30% of the fruit area;
Level 3: the disease spot area accounted for 31%-50% of the fruit area;
Level 4: the disease spot area accounted for more than 50% of the fruit area.

1.2.2.3 The disease index and the control effect were calculated according to the following formula Incidence rate (%)=numbers of diseased plants×100/ total numbers of investigated plants Disease Index (%)=Σ(Numbers of diseased plants at all levels×disease level)×100/(total numbers of investigated plants×most advanced level)

$$\text{Control effect (\%)} = \left(1 - \frac{CK_0 \times Pt_1}{CK_1 \times Pt_0}\right) \times 100$$

$CK_0$ and $CK_1$ were disease index before and after administration in control area respectively, $Pt_0$ and $Pt_1$ were disease index before and after administration in treatment area, respectively.

2. Results and Analysis
2.1 Control Effect of Powdery Mildew on Strawberry Leaves On 13 December, the incidence rate of strawberry powdery mildew was 5.56% and the disease index was 1.11 (Table 5). Seven days after the first administration, the incidence rate and disease index of the treatment group and the control group increased, indicating that powdery mildew spread quickly and the onset of B. velezensis solution was slow, but when compared with the control, the symptoms of the disease in treatment group were effectively reduced, the control effect was 91.98%. Seven days after the second administration, the morbidity extent of the treatment group and the control group was reduced, the incidence rate decreased by 72.74% and 71.43% respectively, disease index decreased by 76.88% and 86.13% respectively, the disease was maintained at the level of mild onset, and the control effect was 86.64%. Seven days after the third administration, the morbidity extent was the same as that after the second administration.

After the 7 days of second and third administrations, the incidence rate of powdery mildew was reduced in control group without administration, because after the occurrence of powdery mildew, spore concentration of powdery mildew were greatly reduced and growth environment of strawberry were improved by means of physical measures such as removing diseased and old leaves, strengthening ventilation and increasing shed temperature.

TABLE 5

Control effect of the soluble granule of *B. velezensis* on powdery mildew of strawberry leaves

| treatment | before administration | | 7 d after the first administration | | | 7 d after the second administration | | | 7 d after the third administration | | |
|---|---|---|---|---|---|---|---|---|---|---|---|
| | Incidence rate % | disease index | Incidence rate % | disease index | Control effect % | Incidence rate % | disease index | Control effect % | Incidence rate % | disease index | Control effect % |
| *B. velezensis* soluble granule | 5.56 | 1.11 | 12.22 | 1.60 | 91.98 | 3.33 | 0.37 | 86.64 | 3.33 | 0.37 | 86.64 |
| CK | 6 | 0.89 | 28 | 16 | — | 8 | 2.22 | — | 8 | 2.22 | — |

CK: Control.

2.2 Control Effect on Powdery Mildew of Strawberry Fruits

The initial incidence rate of strawberry powdery mildew was 16.67%, and the disease index was 8.61 (Table 6). On 7 day after the first administration, the incidence rate and disease index in the treatment group and the control group decreased significantly, the control effect was 30.44%. On 7 day after the second administration, the incidence rate and disease index in treatment area decreased by 16.64% and 49.7% respectively, indicating that although diseased fruits did not largely decreased in number, the morbidity extent of powdery mildew on diseased fruits decreased by nearly 50%, as compared with the control, in which the incidence rate and disease index of diseased fruits increased by 77.78% and 70.55% respectively, and the control effect reached 86.32%. On 7 day after the third administration, the control effect was 71.08%, but the morbidity extent of the fruits in the control area was alleviated, and the incidence rate and disease index decreased owing to the measures, such as removing the diseased fruits and picking at the same time.

3. Conclusions and Discussions

There are many studies on the control of Strawberry Powdery Mildew with biocontrol agents. It has been shown in previous studies that *B. subtilis* has been used to control powdery mildew of strawberry, with a control effect of 40%-65%. The study of Chen Chong et al. (Chen Chong, Wang Chengliang, Zhang Lusheng, *Bacillus cereus* TS-02 for the control of Strawberry Powdery mildew, Anhui Agricultural Science, 2007, 35 (11): 3298-3300) showed that the field control effect of *B. cereus* on Strawberry Powdery Mildew was more than 50%. In addition, the composite formulation of *B. subtilis* and Jinggangmycin had better control effect on Strawberry Powdery Mildew than single bio-control agent, especially in the aspects of quick onset and durability.

In this example, the soluble granule of *B. velezensis* prepared in Example 3 was used to control strawberry powdery mildew. It was applied once every seven days for three times totally. The overall control effect was better. The control effect on leaves is more than 85%, the control effect on fruits was more than 70%, and the efficacy was equivalent

TABLE 6 control effect of *B. velezensis* soluble granule on powdery mildew of strawberry fruits

| treatment | before spraying | | 7 d after the first administration | | | 7 d after the second administration | | | 7 d after the third administration | | |
|---|---|---|---|---|---|---|---|---|---|---|---|
| | Disease rate % | Disease index | Disease rate % | Disease index | Control effect % | Disease rate % | Disease index | Control effect % | Disease rate % | Disease index | Control effect % |
| *B. velezensis* soluble granules | 16.67 | 8.61 | 7.78 | 2.5 | 30.44 | 6.67 | 1.67 | 86.32 | 2.22 | 0.83 | 71.08 |
| CK | 16 | 3.3 | 4 | 1.39 | — | 18 | 4.72 | — | 4 | 1.11 | — |

2.3 Safety for Strawberries

After administration, no symptom, such as burning spot, yellowing and dwarfing was found, and the plants grew normally. Therefore, the soluble granule of *B. velezensis* was safe for strawberries, and at the same time it was discovered that it had no effect on bees, and can be used to control Strawberry Powdery Mildew in the fields. It was also found that, there were a few deformed fruits in the treatment plot and the control, the possible reason for this was the facts that, excessive air humidity brought by spraying the pesticides in a flowering period of strawberries resulted in blocked anther dehiscence and poor pollen transmission, which in turn increased deformed fruits. Therefore, agricultural pesticides should be applied as little as possible during the flowering period, and it is necessary to prevent the occurrence of strawberry powdery mildew as early as possible.

to or better than that of conventional powdery mildew chemicals. Considering that the Strawberry Powdery Mildew should be prevented as soon as possible in practical production, it is recommended that the soluble granule of *B velezensis* according to the present application should be sprayed three times in succession one month after the planting of strawberries, with an interval of 7 days.

EXAMPLE 8: CONTROL OF ROOT-KNOT NEMATODE DISEASE IN CUCUMBER IN GREENHOUSE BY 20 BILLION CFU/g OF *B. velezensis* SOLUBLE GRANULE 1. Materials and Methods
1.1 Materials
1.1.1 Test Agents The soluble granule of *B. velezensis* prepared in Example 3, 20 billion CFU/g.

Other agents: dazomet (98%), commonly used fumigating nematocide commercially available from Nantong Shizhuang Chemical Co., Ltd, Jiangsu, China; fluopicolide (41.7%), new non-fumigating chemical nematocide, commercially available from Bayer Crop Science Company; *Paecilomyces lilacinus* (200 million CFU/g), commonly used biological nematocide, commercially available from Jiangxi New Dragon Biotechnology Co., Ltd, Jiangxi, China.

1.1.2 Test Crop

Cucumber variety: Jinyou No. 35.

1.1.3 Control Targets

Cucumber root nematode disease, occurring spontaneously in the field and in a greenhouse, wherein the pathogen is *Meloidogyne incognita*.

1.2 Methods 1.2.1 Test Settings

The test was carried out in a greenhouse for producing cucumber at Jinliuhuan Agricultural Garden in Changping District, Beijing, China. There were 1 blank control group, 3 chemical control groups, and 2 treatment groups as follows:

Blank control ($CK_0$): water;

Chemical control group 1 ($CK_1$): dazomet (98%) with a dosage of 40 g/m$^2$, the greenhouse soil fumigating with dazomet at high temperature for 20 days from September 30 and exposed for 10 days from Oct. 20, 2018;

Chemical control group 2 ($CK_2$): fluopicolide (41.7%) with a dosage of 0.03 mL per plant, irrigating roots with fluopicolide by adding water after planting;

Chemical control group 3 ($CK_3$): *Paecilomyces lilacinus* (200 million CFU/g), dosage of 40 g/m$^2$, hole application of mixture of *P. lilacinus* with soil before planting;

Treatment group 1 ($TR_1$): *B. velezensis* CGMCC No. 14384 soluble granule (20 billion CFU/g), 20 g/m$^2$, single dose treatment, hole application of mixture of the soluble granule with soil before planting;

Treatment group 2 ($TR_2$): *P. lilacinus* (20 g/m$^2$)+*B. velezensis* CGMCC No. 14384 soluble granule (10 g/m$^2$), viz. treatment with complex microbial formulation. Mix the two pesticides before planting, and hole-apply the resultant homogeneous mixture.

Each of the above groups was repeated three times, wherein replicate plot had an area of 25 m$^2$ and 90 cucumber plants were planted in each replicate plot. Self-rooted cucumber seedlings were transplanted on Oct. 30, 2018, and the test was over on Mar. 30, 2019.

1.2.2 Investigation Methods

In the test, three parameters were investigated, viz., the density of $J_2$ (the second instar larva of root knot nematodes) in soil, plant height in early stage and root-knot disease index of cucumber respectively, so as to evaluate comprehensively the effect of the soluble granule of *B. velezensis* according to the present application compared with the conventional nematocides.

Investigation on the density of $J_2$ in soil: $J_2$ was separated by shallow disk method, and measured by stereoscope. Soil samples were taken one time before fumigation of dazomet (30 September); samples were taken for each replicate one day before planting (30 October); each replicate was sampled by five-spot-sampling method as one sample; the test was finished on 30 March the next year, soil samples were taken by five-spot-sampling method (five plants were set at each point) next to the root of crops.

Decrease rate of population density of $J_2$ (%)=(population density of $J_2$ before administration−population density of $J_2$ at the end of experiment)×100/population density of $J_2$ before administration Relative decline rate of population density of $J_2$ (%)=decrease rate of population density of different treatments−decrease rate of population density of blank control Investigation on plant height: the natural plant height was measured before topping off. The height from the surface to the top of a plant was recorded as plant height.

Root-knot disease index: after the end of the test, the root of each repetitive plant was taken out uniformly, and 30 representative plants were taken from each replicate for investigation. The 10-grade classification standard and the calculation method of disease index are as follows.

The root knots were divided into the following 0-10 grades based on the proportion of root knot on plant roots and the location of root knot, with reference to Bridge and Page method (Bridge J, Page S L J. Estimation of root-knot nematode infection levels on roots using a rating chart. Tropical Pest Manag, 1980, 26: 296-298.).

Level 0: no knots on roots;

Level 1: few small roots which are difficult to find;

Level 2: small but clearly visible knots on secondary roots;

Level 3: some larger visible knots on secondary roots;

Level 4: larger knots predominate on secondary roots, but no knots on main roots;

Level 5: 50% of roots affected. Knots appearing on some main roots. function of root system affected;

Level 6: knots on main roots;

Level 7: lots of knots on main roots;

Level 8: knots on all main roots, including tap root and Few roots not affected;

Level 9: All roots severely knotted, and the plant usually would dye;

Level 10: All roots severely knotted. No root system. Plant dead.

Root knots at Level 1-4 only appeared on secondary roots, and root knots at Level 5-10 were distributed on primary lateral roots and main roots.

Disease index=Σ(number of diseased plants at all levels×disease grade value)×100/(total number of investigated plants×highest grade level)

Treatment effect (%)=(experimental treatment data−blank control data)×100/blank control data 2. Results and Analysis 2.1 Effects on Population Density of $J_2$ in Soil The results showed that the population density of $J_2$ of *Meloidogyne incognita* increased by 2.74% and 119.21% in $CK_0$ blank control and $CK_1$ respectively, and decreased by 73.31% and 33.14% in $CK_2$ and $CK_3$ control respectively; while the population density decreased by 17.15% and 28.88% in the two treatment groups, $TR_1$ "*B. velezensis*" and $TR_2$ "*P. lilacinus+B. velezensis*", respectively. Compared with the blank control, the relative population decline rates in $CK_1$, $CK_2$, $CK_3$, $TR_1$ and $TR_2$ were −116.47%, 76.05%, 35.88%, 19.89% and 31.62%, respectively. It showed that fluopicolide (41.7%) could significantly reduce $J_2$ population density. *Paecilomyces lilacinus* also had some effect; although the effect of of *B. velezensis* alone was not ideal, but it showed a certain effect in combination with *P. lilacinus* with the respective dosage being half of the dosage used alone. The density of $J_2$ population increased after dazomet treatment, the possible reasoning is that the low temperature in winter rendered it difficult for dazomet to exert its efficiency sufficiently.

TABLE 7 effect of the soluble granule of *B. velezensis* on population density of second instar larvae in soil (strip/100 mL soil)

| | Before administration | End of test | Population decline rate (%) | Relative population reduction rate (%) |
|---|---|---|---|---|
| $CK_0$, Water | 572 | 587 | −2.74 | — |
| $CK_1$, Dazomet (98%, 40 g/m$^2$) | 429 | 940 | −119.21 | −116.47 |
| $CK_2$, Fluopicolide (41.7%, 0.03 mL per plant) | 390 | 104 | 73.31 | 76.05 |
| $CK_3$, *P. lilacinus* (200 million CFU/g, 40 g/m$^2$) | 636 | 425 | 33.14 | 35.88 |
| $TR_1$, *B. velezensis* (20 billion CFU/g, 20 g/m$^2$) | 480 | 398 | 17.15 | 19.89 |
| $TR_2$, *P. lilacinus* (20 g/m$^2$) + *B. velezensis* (10 g/m$^2$) | 502 | 357 | 28.88 | 31.62 |

2.2. Effect on Plant Height in Early Stage

The results showed that $CK_2$, $CK_3$, $TR_1$ and $TR_2$ all increased the plant height of cucumber in the early growth stage except $CK_1$, compared with $CK_0$. The percentage of increase was 6.5%, 3.5%, 9.0% and 0.3% respectively. *B. velezensis* not only could inhibit $J_2$ of Root-knot Nematode in soil, but also effectively promoted plant growth (table 8).

TABLE 8

Effect of the soluble granule of *B. velezensis* on plant height (cm) at early stage

| | $R_1$ | $R_2$ | $R_3$ | Avg. value | Growth effect (%) |
|---|---|---|---|---|---|
| $CK_0$, Water | 102.4 | 97.8 | 102.7 | 101.0a | — |
| $CK_1$, Dazomet (98%, 40 g/m$^2$) | 98.5 | 99.8 | 103.5 | 100.6a | −0.4 |
| $CK_2$, Fluopicolide (41.7%, 0.03 mL per plant) | 109.4 | 104.1 | 109.3 | 107.6bc | 6.5 |
| $CK_3$, *P.s lilacinus* (200 million CFU/g, 40 g/m$^2$) | 106.7 | 102.1 | 104.9 | 104.6ab | 3.5 |
| $TR_1$, *B. velezensis* (20 billion CFU/g, 20 g/m$^2$) | 108.7 | 107 | 114.7 | 110.1c | 9.0 |
| $TR_2$, *P. lilacinus* (20 g/m$^2$) + *B. velezensis* (10 g/m$^2$) | 99.5 | 103.7 | 100.7 | 101.3a | 0.3 |

Note:
R represents the average value of each replicate (the same below).

2.3. Effect on Root Knot Index of Plants

The results showed that $CK_1$, $CK_2$, $CK_3$, $TR_1$ and $TR_2$ treatments could alleviate root knot disease to a certain extent, compared with $CK_0$, with control effect ranging from 18.15% to 30.77%. Because cucumber is a crop highly sensitive to *Meloidogyne incognita*, the disease index of different treatments did not show significantly difference. Although the effect of *B. velezensis* according to the present application alone was not outstanding compared with the control agents, it still showed certain control effect, especially when mixed with *P. lilacinus* in half.

TABLE 9 effect of the soluble granule of *B. velezensis* on root-knot index of plants

| | $R_1$ | $R_2$ | $R_3$ | Avg. value | Growth effect (%) |
|---|---|---|---|---|---|
| $CK_0$, Water | 43.00 | 34.33 | 31.00 | 36.11b | — |
| $CK_1$, Dazomet (98%, 40 g/m$^2$) | 27.33 | 25.67 | 26.33 | 26.44ab | 26.77 |
| $CK_2$, Fluopicolide (41.7%, 0.03 mL per plant) | 28.33 | 22.00 | 24.67 | 25.00a | 30.77 |
| $CK_3$, *P. lilacinus* (200 million CFU/g, 40 g/m$^2$) | 32.33 | 24.00 | 25.00 | 27.11ab | 24.92 |
| $TR_1$, *B. velezensis* (20 billion CFU/g, 20 g/m$^2$) | 36.00 | 22.67 | 30.00 | 29.56ab | 18.15 |
| $TR_2$, *P. lilacinus*(20 g/m$^2$) + *B. velezensis* (10 g/m$^2$) | 27.67 | 20.67 | 34.00 | 27.44ab | 24.00 |

3. Conclusion and Discussion

As a new microbial agent, *B. velezensis* had shown excellent characteristics in the prevention and control of plant pathogenic fungal diseases. Although the effect of the soluble granule of *B. velezensis* according to the present application in the prevention and control of *Meloidogyne incognita* disease of cucumber was not as good as that of mature mainstream Nematocides such as Dazomet, Fluopicolide, and *Paecilomyces lilacinus*, it could reduced the population density and root disease index of root knot nematode to a certain extent, and could effectively promote the growth of cucumber plants, reflecting certain potential.

EXAMPLE 9: CONTROL OF RICE BAST IN THE FIELD BY 20 BILLION CFU/g OF *B. velezensis* SOLUBLE GRANULES 1. Materials and Methods
1.1 Materials
1.1.1 Test Agents The soluble granules of *B. velezensis* prepared in example 3, 20 billion CFU/g. 20 billion CFU/g wettable powder (*Bacillus. subtilis*), produced by Hainan Limont Biopesticide Co., Ltd, China; 6% kasugamycin wettable powder, produced by Wuhan Kono Biotechnology Co., Ltd, Hubei, China; 75% Tricyclazole water dispersible granule, produced by Shanghai Heben Pharmaceutical Co., Ltd, China.
1.1.2 Test Crop
Rice variety: Yi Xiang 107.
1.1.3 Control Target
Rice blast, occurring spontaneously in the field.
1.2 Method
1.2.1 Test Settings The test was conducted in Nanping Township, Enshilichuan City, Hubei Province, China. There were 1 blank control group, 3 chemical control groups and 1 treatments groups in the experiment, as given below:

Blank control group ($CK_0$): water;
Chemical control group 1 ($CK_1$): 20 billion CFU/g, *B. subtilis* wettable powders, 100 g/666.7 m$^2$;
Chemical control group 2 ($CK_2$): 6% kasugamycin, wettable powder, 50 g/666.7 m$^2$;
Chemical control group 3 ($CK_3$): 75% Tricyclazole, water-dispersible granule, 25 g/666.7 m$^2$;
Test treatment group 1 ($TR_1$): 20 billion CFU/g, *B. velezensis* soluble granule (CGMCC No. 14384) according to the present application, 100 g/666.7 m$^2$.

Each of the above treatment group was administered three times, in triplicate, in each plot of 50 m$^2$. The plots were randomly arranged, and protective rows were set around them.

1.2.2. Instrument and Method for Administration

A knapsack electric sprayer (3WBD-20, Shandong Guard Plant Protection Machinery Co. Ltd, China) was used. The water solutions of the above-mentioned agents were administered to the positive and negative side of rice leaves in a dosage of 50 kg per 666.7 m² by spraying in order from low to high concentration of test solutions. After administration of each treatment 3 times, the sprayer was washed for proceeding to the next treatment.

1.2.3 Time and Frequency for Administration

The water solutions of the agents were firstly administered at booting stage of rice, followed by the second administration 7 days later and the third administration 14 days later.

1.2.4 Investigation Methods 1.2.4.1 Leaf Blast

The criteria for classification of leaf blast were as follows (GB/T 17980.19-2000: Pesticide-Guidelines for the field efficacy trials(I)—Fungicides against leaf diseases of rice):

Level 0: no disease;
Level 1: disease spots on leaf less than 6, disease spot length less than 1 cm;
Level 3: 6-10 diseased spots on leaf, length of some disease spot greater than 1 cm;
level 5: 11-25 disease spots on leaf, part of the disease spots linking up into a single stretch and accounting for 10-25% of the leaf area;
Level 7: 26 or more disease spots on leaf, disease spots linking up into a single stretch and accounting for 26-50% of the leaf area;
Level 9 levels: disease spots linking up into a single stretch and accounting for more than 50% of the leaf area, or the whole leaf dead.

1.2.4.2 Panicle Blast

The criteria for classification of panicle blast were as follows (GB/T 17980.19-2000: Pesticide-Guidelines for the field efficacy trials(I)—Fungicides against leaf diseases of rice):

Level 0: no disease;
Level 1: loss of less than 5% per panicle (individual branches diseased);
Level 3: loss of 6-20% per panicle (about ⅓ branches diseased);
Level 5: loss of 21-50% per panicle (neck or spindle diseased, grain half-shriveled);
Level 7: loss of 51-70% per panicle (neck of panicle diseased, most of grain shriveled);
Level 9: loss of 71-100% per panicle (neck of panicle diseased, white panicle occurring).

The disease base was investigated before the first administration, the control effect of leaf blast was investigated 7 days and 14 days after the first administration, and the control effect of panicle blast was investigated 27 days after the first administration. 50 plants were sampled at 5 points per plot, and flag leaf and 2 leaves below flag leaf were investigated; and 50 panicles per point of were investigated for panicle blast.

$$\text{Disease index (\%)} = \Sigma(\text{number of disease plants at all levels} \times \text{disease grade value}) \times 100 / (\text{total number of investigated plants} \times \text{highest grade value})$$

$$\text{Control effect of leaf blast (\%)} = \left(1 - \frac{CK_0 \times Pt_1}{CK_1 \times Pt_0}\right) \times 100$$

$$\text{Control effect of Panicle Blast (\%)} = \frac{CK - Pt}{CK} \times 100$$

$CK_0$ and $CK_1$ were disease index before and after administration in control area, $Pt_0$ and $Pt_1$ were disease index before and after administration in treatment area, respectively.

2. Results and Analysis 2.1 Safety Investigation

The 4 types of test agents showed no harmful and adverse effects in designed concentration and dosage.

2.2. Control Effect on Rice Blast Without Chemicals

TABLE 10

Control effect of different test agents on rice blast

| Treatment | Leaf rust before administration | 7 d After first administration | | 14 d After first administration | | 27 d After first administration | |
|---|---|---|---|---|---|---|---|
| | | Avg. leaf blast disease index | Avg. control effect (%) | Avg. leaf blast disease index | Avg. control effect (%) | Avg. panicle blast disease index | Relative control (%) |
| TR₁ | 1.62 | 2.16 | 45.5A | 2.31 | 57.1A | 0.67 | 73.9A |
| CK₁ | 1.15 | 2.00 | 29.4B | 2.24 | 41.5B | 1.30 | 49.6B |
| CK₂ | 1.61 | 2.26 | 40.8AB | 2.30 | 55.7A | 0.86 | 66.3A |
| CK₃ | 1.59 | 2.04 | 48.2A | 2.14 | 60.3A | 0.65 | 74.7A |

It can be seen from table 10 that the soluble granule of *B. velezensis* wettable powder of kasugamycin, and water-dispersible granules of Tricyclazole all had better control effect on leaf blast 14 days after administration. The control effect of Tricyclazole was the highest, followed by that of *B velezensis*, but there was no significant difference among the three chemicals, and the control effect of *B. subtilis* was the worst. The control effect of tricyclazole and *B. velezensis* on ear blast was higher than 70%, better than that of kasugamycin, but there was no significant difference among the three agents, and the control effect of *B. subtilis* was the worst.

3. Conclusion and Discussion

The results showed that: *B. velezensis*, kasugamycin and Tricyclazole had good control effect on rice blast. Within the used dosage range of test agents, each agent was safe and harmless to rice. The growth and leaf color of rice in each treatment area visually measured was the best in the Tricyclazole treatment area, followed by *B. velezensis* and kasugamycin treatment area, and diseased leaves of rice in the blank control exhibited withering symptoms in. *B. velezensis* and Tricyclazole had better control effect on Panicle Blast than on leaf blast.

Tricyclazole and Kasugamycin are the most commonly used fungicides to control rice blast, and there are already rice blast fungi with a low level of resistance to them. In this example, the control effect of *B. velezensis* on rice blast was no less than that of conventional agents such as Tricyclazole and Kasugamycin, and was better than that of *B. subtilis* fungicides in the market. Therefore, the soluble granule of *B. velezensis* according to the present application can be used to control rice blast in practical application, and may be rotated with other conventional fungicides to delay the emergence of resistance and prolong the service life of fungicides.

The use of the terms "a", "an", "the" and similar referents in the context of describing the application (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

What is claimed is:

1. A soluble granule of *Bacillus velezensis*, comprising:
   x parts by weight, where 0.1≤x<97, of stock powder of the *Bacillus velezensis* or/and stock powder of secondary metabolic active bacteriostatic substances of the *Bacillus velezensis*,
   1-5 parts by weight of a binder,
   1-10 parts by weight of a disintegrant,
   1-5 parts by weight of a dispersant, and
   a filler making up to 100 parts by weight,
   wherein
   the stock powder of the *Bacillus velezensis* or/and the stock powder of the secondary metabolic active bacteriostatic substances of the *Bacillus velezensis* are obtained by spray drying a fermentation broth of a tertiary fermentation of the *Bacillus velezensis*,
   a mass fraction ratio of the stock powder of *Bacillus velezensis* to the stock powder of the secondary metabolic active bacteriostatic substances of the *Bacillus velezensis* is 100:0-0:100; and
   raw materials used in a preparation of the stock powder of the *Bacillus velezensis* or/and the stock powder of the secondary metabolic active bacteriostatic substances of the *Bacillus velezensis* are completely water-soluble, food-grade raw materials, and are selected from the group consisting of yeast powder, peptone, NaCl, sucrose, soluble starch, and combinations thereof.

2. The soluble granule of *Bacillus velezensis* according to claim 1, wherein the raw materials used in the preparation of the stock powder of the *Bacillus velezensis* or/and the stock powder of the secondary metabolic active bacteriostatic substances of the *Bacillus velezensis* comprise the yeast powder, peptone, NaCl, sucrose, and the soluble starch.

3. The soluble granule of *Bacillus velezensis* according to claim 2, wherein
   the stock powder of the *Bacillus velezensis* comprises an amount of at least 100 billion CFU (colony forming unit)/g of the *Bacillus velezensis*; and
   the secondary metabolic active bacteriostatic substances of the *Bacillus velezensis* are selected from the group consisting of proteins, enzymes, and ester peptides produced by the *Bacillus velezensis*.

4. The soluble granule of *Bacillus velezensis* according to claim 1, wherein an amount of the stock powder of the *Bacillus velezensis* is 10-30 parts, and an amount of the stock powder of the secondary metabolically active bacteriostatic substances of the *Bacillus velezensis* is 0-50 parts, per 100 parts by weight.

5. The soluble granule of *Bacillus velezensis* according to claim 1, wherein
   the binder is one or more selected from the group consisting of the soluble starch, xanthan gum, polyvinyl alcohol, soybean protein, and combinations thereof; and
   an amount of the binder in the soluble granule is 3-5 parts, per 100 parts by weight of the soluble granule.

6. The soluble granule of *Bacillus velezensis* according to claim 1, wherein
   the disintegrant is one or more selected from the group consisting of milk powder, glucose, ammonium sulfate, sodium acetate, and combinations thereof; and
   an amount of the disintegrant in the soluble granule is 5-10 parts, per 100 parts by weight of the soluble granule.

7. The soluble granule of *Bacillus velezensis* according to claim 1, wherein
   the dispersant is one or more selected from the group consisting of yeast powder, sodium lignosulfonate, polyacrylamide, and combinations thereof; and
   an amount of the dispersant in the soluble granule is 3-5 parts, per 100 parts by weight of the soluble granule.

8. The soluble granule of *Bacillus velezensis* according to claim 1, wherein the filler is one or more selected from the group consisting of maltodextrin, sodium chloride, sodium bicarbonate, and combinations thereof.

9. A method for preparing the soluble granule of *Bacillus velezensis* according to claim 1, comprising the steps of:
   a) placing the stock powder of *Bacillus velezensis* or/and the stock powder of the secondary metabolic active bacteriostatic substances of the *Bacillus velezensis*, the binder, the disintegrant, the dispersant and the filler in a tank in order, and mixing thoroughly to form a mixed material;
   b) ultra-micro crushing the mixed material in an airflow pulverizer to form an ultra-micro crushed mixture;
   c) evenly kneading the ultra-micro crushed mixture in a mixer, and adding water slowly until the ultra-micro crushed mixture begins to aggregate into a pellet;
   d) granulating by extruding the pellet through a squeezing granulator to make granules;
   e) drying the granules at a temperature of 30° C-40° C., until moisture of the granules is less than 4%; and f) screening the granules through a 20 mesh vibrating screen classifier and a 40 mesh vibrating screen classifier respectively, to form the soluble granule of *Bacillus velezensis* having a granule size between 40 mesh and 20 mesh.

10. A method for preventing and controlling plant diseases and/or promoting plant growth, comprising: applying the soluble granule of *Bacillus velezensis* according to claim 1.

11. The method according to claim 10, wherein the raw materials used in the preparation of the stock powder of the *Bacillus velezensis* or/and the stock powder of the secondary metabolic active bacteriostatic substances of the *Bacillus velezensis* comprise the yeast powder, peptone, NaCl, sucrose, and the soluble starch.

12. The method according to claim 11, wherein
the stock powder of the *Bacillus velezensis* comprises an amount of at least 100 billion CFU (colony forming unit)/g of the *Bacillus velezensis*; and
the secondary metabolic active bacteriostatic substances of the *Bacillus velezensis* are selected from the group consisting of proteins, enzymes, and ester peptides produced by the *Bacillus velezensis*.

13. The method according to claim 10, wherein an amount of the stock powder of the *Bacillus velezensis* is 10-30 parts, and an amount of the stock powder of the secondary metabolic active bacteriostatic substances of *Bacillus velezensis* is 0-50 parts, per 100 parts by weight of the soluble granule.

14. The method according to claim 10, wherein
the binder is one or more selected from the group consisting of the soluble starch, xanthan gum, polyvinyl alcohol, soybean protein and combinations thereof; and
an amount of the binder in the soluble granule is 3-5 parts, per 100 parts by weight of the soluble granule.

15. The method according to claim 10, wherein
the disintegrant is one or more selected from the group consisting of milk powder, glucose, ammonium sulfate, sodium acetate and combinations thereof; and
an amount of the disintegrant in the soluble granule is 5-10 parts, per 100 parts by weight of the soluble granule.

16. The method according to claim 10, wherein
the dispersant is one or more selected from the group consisting of the yeast powder, sodium lignosulfonate, polyacrylamide and combinations thereof; and
an amount of the dispersant in the soluble granule is 3-5 parts, per 100 parts by weight of the soluble granule.

17. The method according to claim 10, wherein the filler is one or more selected from the group consisting of maltodextrin, sodium chloride, sodium bicarbonate, and combinations thereof.

18. The soluble granule of Bacillus velezensis according to claim 1, wherein the x parts by weight comprises stock powder of secondary metabolic active bacteriostatic substances of the *Bacillus velezensis*.

19. A soluble granule of *Bacillus velezensis*, consisting of:
x parts by weight, where $0.1 \leq x < 97$, of stock powder of the *Bacillus velezensis* or/and stock powder of secondary metabolic active bacteriostatic substances of the *Bacillus velezensis*,
1-5 parts by weight of a binder,
1-10 parts by weight of a disintegrant,
1-5 parts by weight of a dispersant, and
a filler making up to 100 parts by weight,
wherein
the stock powder of the Bacillus velezensis or/and the stock powder of the secondary metabolic active bacteriostatic substances of the *Bacillus velezensis* are obtained by spray drying a fermentation broth of a tertiary fermentation of the *Bacillus velezensis*,
a mass fraction ratio of the stock powder of Bacillus velezensis to the stock powder of the secondary metabolic active bacteriostatic substances of the Bacillus velezensis is 100:0-0:100; and
raw materials used in a preparation of the stock powder of the *Bacillus velezensis* or/and the stock powder of the secondary metabolic active bacteriostatic substances of the *Bacillus velezensis* are completely water-soluble, food-grade raw materials, and are selected from the group consisting of yeast powder, peptone, NaCl, sucrose, soluble starch, and combinations thereof.

\* \* \* \* \*